United States Patent
Hendrie et al.

(10) Patent No.: US 11,808,104 B2
(45) Date of Patent: Nov. 7, 2023

(54) SEAL FOR A WELL

(71) Applicant: PLEXUS HOLDINGS, PLC, Aberdeen (GB)

(72) Inventors: Craig Francis Bryce Hendrie, Aberdeen (GB); Bernard Herman Van Bilderbeek, Aberdeen (GB); Brent Harrald, Aberdeen (GB)

(73) Assignee: Plexus Holdings, PLC, Aberdeen (GB)

( * ) Notice: Subject to any disclaimer, the term of this patent is extended or adjusted under 35 U.S.C. 154(b) by 0 days.

(21) Appl. No.: 17/279,658

(22) PCT Filed: Sep. 27, 2019

(86) PCT No.: PCT/GB2019/052731
§ 371 (c)(1),
(2) Date: Mar. 25, 2021

(87) PCT Pub. No.: WO2020/065335
PCT Pub. Date: Apr. 2, 2020

(65) Prior Publication Data
US 2022/0034189 A1 Feb. 3, 2022

(30) Foreign Application Priority Data
Sep. 28, 2018 (GB) ..................................... 1815929

(51) Int. Cl.
*E21B 33/12* (2006.01)
*E21B 33/04* (2006.01)
*F16J 15/02* (2006.01)

(52) U.S. Cl.
CPC .......... *E21B 33/1212* (2013.01); *E21B 33/04* (2013.01); *F16J 15/025* (2013.01)

(58) Field of Classification Search
CPC ............................. E21B 33/1212; E21B 33/04
See application file for complete search history.

(56) References Cited

U.S. PATENT DOCUMENTS

| 4,757,860 A | 7/1988 | Reimert |
| 4,913,469 A * | 4/1990 | Baugh ................. E21B 33/0422 285/123.6 |

(Continued)

FOREIGN PATENT DOCUMENTS

WO 02/077496 A2 10/2002

OTHER PUBLICATIONS

International Search Report and Written Opinion (Application No. PCT/GB2019/052731) dated Jan. 24, 2020.

(Continued)

*Primary Examiner* — Nicole Coy
*Assistant Examiner* — Nicholas D Wlodarski
(74) *Attorney, Agent, or Firm* — Brown & Brown IP Law PLLC

(57) ABSTRACT

A pressure energised seal for a wellhead, in particular, provides a seal of an annulus between an inner wellhead casing member and an outer wellhead casing member. The wellhead incorporates a clamping arrangement whereby the outer member is arranged to be deflected radially inwardly in order to grip and secure the inner member within the bore of the outer member. Also, a seal for use in such a clamping arrangement. In particular, the seal includes a sealing lip which locates within a groove provided in the outer clamping surface of the inner member. A seal is activated and created as the outer member is clamped inwardly since this causes the outer member to compress the inner member and to reduce the diameter of the inner member. Also, a well and a method of sealing an annulus in a well.

23 Claims, 5 Drawing Sheets

(56) References Cited

U.S. PATENT DOCUMENTS

| | | | |
|---|---|---|---|
| 10,947,804 B2 * | 3/2021 | Ingram | F16J 15/28 |
| 2004/0094898 A1 | 5/2004 | Zheng | |
| 2004/0163821 A1 | 8/2004 | Bilderbeek | |
| 2005/0139360 A1 * | 6/2005 | Van Bilderbeek | E21B 33/0422 |
| | | | 166/208 |
| 2011/0227296 A1 | 9/2011 | Baca | |
| 2012/0067597 A1 | 3/2012 | Lang et al. | |
| 2017/0336003 A1 * | 11/2017 | Irvine | F16L 23/20 |

OTHER PUBLICATIONS

GB Search Report (Application No. 1815929.3) dated Mar. 12, 2019.

\* cited by examiner

SEAL FOR A WELL

FIELD OF THE INVENTION

The present invention relates to a seal for a well, a sealing member for a well, a well casing incorporating a seal for a well, a well incorporating a seal and a method of sealing an annulus in a well.

BACKGROUND TO THE INVENTION

Wellheads are used in oil and gas drilling to suspend casing, seal the annulus between casing strings and provide an interface with a blowout protector (BOP). An annulus seal is a device that seals the annulus spaces between adjacent concentric casing and tubing strings.

Conventional land or platform wellheads utilise annulus seals that are either elastomeric seals or metal-to-metal seals. An elastomeric seal is energised by an initial setting squeeze on the elastomer. A metal-to-metal seal is energised by a number of means. Generally, a metal-to-metal seal is energised by pushing a sealing element over a taper to expand the seal element until it contacts the wellhead bore and/or hanger outer diameter.

The present invention provides a seal which is enhanced by pressure activation to provide a high quality metal-to-metal seal that is specifically suited for high pressure applications.

It is an aim of the present invention to overcome at least one problem associated with the prior art whether referred to herein or otherwise.

SUMMARY OF THE INVENTION

According to a first aspect of the present invention there is provided a sealing arrangement comprising an inner well casing and a seal for sealing an annulus in a well, the annulus being formed between an outer surface of the inner well casing and an outer well casing of the well wherein the inner well casing comprises:
  a central longitudinal axis which extends along a longitudinal axis of the inner well casing; and
  an outer clamping surface which is arranged to be secured and clamped by the outer well casing, the outer clamping surface being located at an initial radial distance from the central longitudinal axis of the inner well casing;
  the seal comprising:
  a flexible metal sealing lip which projects radially outwardly and away from the central longitudinal axis of the inner well casing, the metal sealing lip having a distal sealing surface for sealing against an inner surface of the outer well casing;
  wherein, in use, pressure within the annulus is arranged to urge the sealing surface towards the inner surface of the outer well casing.

Preferably, prior to use, the sealing surface locates at an initial radial distance relative to the central longitudinal axis which is less than or equal to the initial radial distance of the outer clamping surface of the inner well casing.

Preferably, in use (in a clamped configuration), the sealing surface locates at a radial distance relative to the central longitudinal axis which is (substantially) the same and/or (substantially) coincident with the radial position of the outer clamping surface of the inner well casing and/or an inner clamping surface of the outer well casing.

Preferably, in use, pressure within the annulus is arranged to urge and/or pivotally urge the sealing lip (outwardly) towards the inner surface of the outer well casing.

Preferably the pressure within the annulus is arranged in use, to urge a distal sealing tip of the sealing lip towards the inner surface of the outer well casing.

Preferably the pressure within the annulus is arranged to energise the seal.

Prior to use, the sealing lip may project at an angle from the outer clamping surface of the inner well casing. Preferably the sealing lip projects at an acute angle from the outer clamping surface of the inner well casing. Preferably the sealing lip is not perpendicular relative to the outer clamping surface.

Preferably, the sealing lip extends towards the side of the annulus to be sealed. Preferably the projection angle is arranged to decrease as the sealing lip is flexed inwardly by the clamping force. Preferably the projection angle is urged towards a greater projection angle as the sealing lip is energised by the pressure in the annulus.

Preferably the sealing lip comprises a pressure containing surface which faces the annulus.

Preferably pressure acting on the pressure containing surface is arranged to urge the sealing lip towards the inner surface of the outer well casing.

Preferably the pressure in the annulus is arranged to increase the sealing strength of the seal. Preferably the sealing strength is arranged to increase with increasing pressure in the annulus. An increase in the pressure in the annulus may be arranged to increase the sealing strength of the seal.

Preferably the (total) sealing pressure is arranged to increase with increasing pressure in the annulus. An increase in the pressure in the annulus may be arranged to increase the sealing pressure of the seal.

The sealing lip may project from a support surface of the inner well casing and wherein the support surface is of a reduced diameter relative to the diameter of the clamping surface of the inner well casing.

The support surface may locate on or adjacent to the outer clamping surface of the inner well casing.

The sealing lip may locate within a groove. The groove may provide the support surface for the sealing lip and a first side wall and a second side wall. The first and second side walls may project radially to a location at least equal to the radial projection of the sealing tip of the sealing lip. The walls may comprise straight sided walls. The walls may be substantially perpendicular relative to the outer clamping surface of the inner well casing.

The groove may comprise a radial groove.

The groove may locate within or adjacent to the outer clamping surface of the inner well casing.

The groove may provide a first groove on a first (axial) side of the sealing lip and a second groove of a second (axial) side of the sealing lip.

The groove may enable the sealing lip to be flexed freely inwardly.

The groove may be arranged to protect the sealing lip. Preferably the groove prevents or inhibits the sealing lip from abutting any obstructions during axial movement of the inner well casing (within the well/outer well casing).

Preferably the sealing lip is arranged to flare outwardly by pressure of a fluid in the annulus.

Preferably the sealing lip does not extend radially beyond the clamping surface of the inner well casing.

More preferably the distal sealing surface does not locate at a radial distance beyond the radial distance of the clamping surface of the inner well casing.

Preferably the clamping force of the outer well casing is arranged to flex the sealing lip to create a seal between the inner well casing and the outer well casing. Preferably the clamping force is arranged to compress the inner well casing in a clamping zone or sealing zone. Preferably the seal is located in the clamping zone or sealing zone.

Preferably the inner well casing comprises an inner wellhead casing. The outer well casing may comprise an outer wellhead casing. The outer wellhead casing may be located within an outer casing string. The inner wellhead casing may be located within an inner casing string. Preferably the inner casing string is located within and/or is concentric with the outer casing string.

Preferably the inner well casing comprises a tubular member. The inner well casing may comprise a cylindrical member. The inner well casing may comprise a hanger which may be arranged, in use, to suspend a casing string. Preferably the hanger is arranged to be clamped in the wellhead and for a casing string to be suspended below the wellhead.

Preferably the outer well casing comprises a tubular member. The outer well casing may comprise a cylindrical member. The outer well casing may comprise a wellhead housing.

The outer clamping surface may comprise a gripping surface.

The outer clamping surface may comprise a profiled surface. The outer clamping surface may comprise a plurality of axial grooves and/or raised axial teeth.

The outer clamping surface (of the inner well casing) may comprise a sealing surface. The outer clamping surface (of the inner well casing) may provide a metal-to-metal sealing surface.

The inner clamping surface of the outer well casing may comprise a sealing surface. The inner clamping surface of the outer well casing may provide a metal-to-metal sealing surface.

The sealing lip and/or the distal sealing surface may provide a sealing surface. The sealing lip and/or the distal sealing surface may provide a metal-to-metal sealing surface.

The sealing lip may be arranged to provide an auxiliary seal in addition to the seal provided by the outer clamping surface.

The outer clamping surface may be provided at or adjacent to an (upper) end of the inner well casing.

The outer clamping surface may comprise a cylindrical section of the inner well casing.

The outer clamping surface may be provided on a hanger of the inner well casing.

The inner well casing may comprise a plurality of seals.

The inner well casing may comprise a first seal and a second seal.

The inner well casing may comprise an upper seal and a lower seal. The upper seal may be arranged to seal pressure from (or a volume) above the upper seal and the lower seal may be arranged to seal pressure from (or a volume) below the lower seal. The upper seal may be arranged to seal and prevent the flow of fluid and/or the lower seal may be arranged to seal and prevent the flow of fluid.

Preferably the seals are arranged to seal the annulus from a first longitudinal direction and to seal the annulus from a second (axially opposite) longitudinal direction.

Preferably the seals are arranged to seal the annulus from pressure located above the wellhead and from pressure located below the wellhead.

Preferably the sealing lip comprises a plastically deformable material. Preferably the sealing lip is arranged to be flexed inwardly by an inwardly directed clamping force and the sealing lip may be arranged to retain the inwardly flexed position (and/or shape) after the removal of the clamping force.

Preferably an inwardly directed clamping force is arranged to flex the sealing lip such that the sealing lip yields.

Preferably the sealing lip is arranged to create a metal-to-metal-seal with the outer well casing.

Preferably the sealing lip extends radially outwardly from a base towards a sealing tip. The sealing tip may comprise a distal sealing tip. The distal sealing tip may comprise a sealing surface.

The sealing lip may be arranged to flex as the outer well casing clamps the inner well casing.

The sealing lip may be arranged to abut an inner clamping surface of the outer well casing and the outer well casing may be arranged to flex the sealing lip inwardly.

An inwardly directed clamping force may be arranged to compress the sealing lip inwardly. The clamping arrangement may be arranged to compress the sealing lip inwardly.

Preferably the sealing lip extends radially to the same extent/distance as the outer clamping surface of the inner well casing and the sealing lip may be arranged to move inwardly as the clamping surface of the inner well casing moves inwardly as the inner well casing is clamped within a clamping arrangement of the well.

Preferably the sealing lip (and especially the distal sealing tip) does not extend beyond the periphery (or circumference) of the clamping surface of the inner well casing.

Preferably the sealing lip (and especially the distal sealing tip) does not extend beyond the periphery (or circumference) of the clamping surface of the outer well casing (when concentrically aligned and axially displaced).

Preferably the inner well casing is freely moveable through the clamping surface of the outer well casing when the clamping arrangement is inactive (e.g. there is no inwardly directed clamping force being applied by or to the outer well casing).

Preferably (prior to use and when the clamping arrangement is inactive) the sealing lip and more preferably the distal sealing tip projects radially to a position which is the same or is less than the radial distance of the clamping surface of the inner well casing.

The seal may be provided on a sealing member. The sealing member may be securable to the inner well casing. The sealing member may be removably securable to the inner well casing.

Preferably the sealing member is securable at or towards an end of the inner well casing.

Preferably the sealing member is securable adjacent to the outer clamping surface of the inner well casing.

The sealing member may be secured to the inner well casing by securement means which may comprise sealing means.

The sealing member may comprise a first seal and a second seal. The first seal may be arranged to seal the annulus from above (a first longitudinal or axial direction) and the second seal may be arranged to seal the annulus from below (a second (opposite) longitudinal or axial direction).

Preferably the inner well casing provides a sealing zone. The sealing zone may comprise the outer clamping surface of the inner well casing which is arranged to create a seal with an outer well casing.

The inner well casing may comprise a back up seal. The back-up seal may comprise an elastomeric seal. Preferably the elastomeric seal is arranged to be compressed as the inner well casing is clamped by a clamping arrangement.

The well may comprise an oil well.

The sealing arrangement may be arranged to seal an annulus located within a well bore.

The sealing arrangement may be arranged to seal an annulus located within a wellhead.

According to a second aspect of the present invention there is provided a well comprising an inner well casing, an outer well casing, a clamping arrangement, and a seal for sealing an annulus in a well, the annulus being formed between an outer surface of the inner well casing and the outer well casing wherein the inner well casing comprises:
- a central longitudinal axis which extends along a longitudinal axis of the inner well casing; and
- an outer clamping surface which is arranged to be secured and clamped by the outer well casing, the outer clamping surface being located at an initial radial distance from the central longitudinal axis of the inner well casing;

the seal comprising:
- a flexible metal sealing lip which projects radially outwardly and away from the central longitudinal axis of the inner well casing, the metal sealing lip having a distal sealing surface for sealing against an inner surface of the outer well casing; and
- wherein, in use, pressure within the annulus is arranged to urge the sealing surface towards the inner surface of the outer well casing.

Preferably, prior to use, the sealing surface locates at an initial radial distance relative to the central longitudinal axis which is less than or equal to the initial radial distance of the outer clamping surface of the inner well casing.

According to a third aspect of the present invention there is provided a method of sealing an annulus in a well, the annulus being formed between an outer surface of an inner well casing and an outer well casing wherein the inner well casing comprises:
- a central longitudinal axis which extends along a longitudinal axis of the inner well casing; and
- an outer clamping surface which is arranged to be secured and clamped by the outer well casing, the outer clamping surface being located at an initial radial distance from the central longitudinal axis of the inner well casing;

the seal comprising:
- a flexible metal sealing lip which projects radially outwardly and away from the central longitudinal axis of the inner well casing, the metal sealing lip having a distal sealing surface for sealing against an inner surface of the outer well casing; and
- wherein, in use, pressure within the annulus is arranged to urge the sealing surface towards the inner surface of the outer well casing;
- the method comprising clamping the inner well casing in the outer well casing and compressing the inner well casing and flexing the sealing lip radially inwardly.

Preferably, prior to use, the sealing surface initially locates at a radial distance relative to the central longitudinal axis which is less than or equal to the initial radial distance of the outer clamping surface of the inner well casing.

According to a fourth aspect of the present invention there is provided a seal for sealing an annulus in a well, the seal being defined in the first aspect of the present invention.

According to a fifth aspect of the present invention there is provided a sealing member comprising a seal for sealing an annulus in a wellhead, the seal being defined in the first aspect of the present invention.

According to a further aspect of the present invention there is provided a sealing arrangement comprising an inner well casing and a seal for sealing an outer surface of the inner well casing and an outer well casing of the well wherein the inner well casing comprises:
- a central longitudinal axis which extends along a longitudinal axis of the inner well casing; and
- an outer clamping surface which is arranged to be secured and clamped by the outer well casing, the outer clamping surface being located at an initial radial distance from the central longitudinal axis of the inner well casing;

the seal comprising:
- a flexible metal sealing lip which projects radially outwardly and away from the central longitudinal axis of the inner well casing, the metal sealing lip having a distal sealing surface for sealing against an inner surface of the outer well casing;
- prior to use, the sealing lip projects at a projection angle from the outer surface of the inner well casing and extends towards a space to be sealed, the projection angle is arranged to decrease as the sealing lip is flexed inwardly by a clamping force and the projection angle is urged towards a greater projection angle as the sealing lip is energised by fluid pressure in the space being sealed.

Preferably the sealing lip comprises a pressure containing surface which faces the space.

Preferably pressure acting on the pressure containing surface is arranged to urge the sealing lip towards the inner surface of the outer well casing.

Preferably the pressure in the space is arranged to increase the sealing strength of the seal. Preferably the sealing strength is arranged to increase with increasing pressure in the space. An increase in the pressure in the space may be arranged to increase the sealing strength of the seal.

BRIEF DESCRIPTION OF THE DRAWINGS

The present invention will now be described, by way of example only, with reference to the drawings that follow, in which.

DESCRIPTION OF THE PREFERRED EMBODIMENTS

Specific preferred embodiments of the present invention will now be described in which specific components of a well will be used although it should be appreciated that the present invention may be used within any suitable well bore. For example, the term well casing may refer to a (or a section of) pipe/conduit/string/conductor/riser/tubular member/wellhead casing etc. of a well. Similarly a well may refer to an oil well (including a gas well) from which hydrocarbons are extracted and/or a geothermal well and any similar such well including a well bore.

Figure 1:
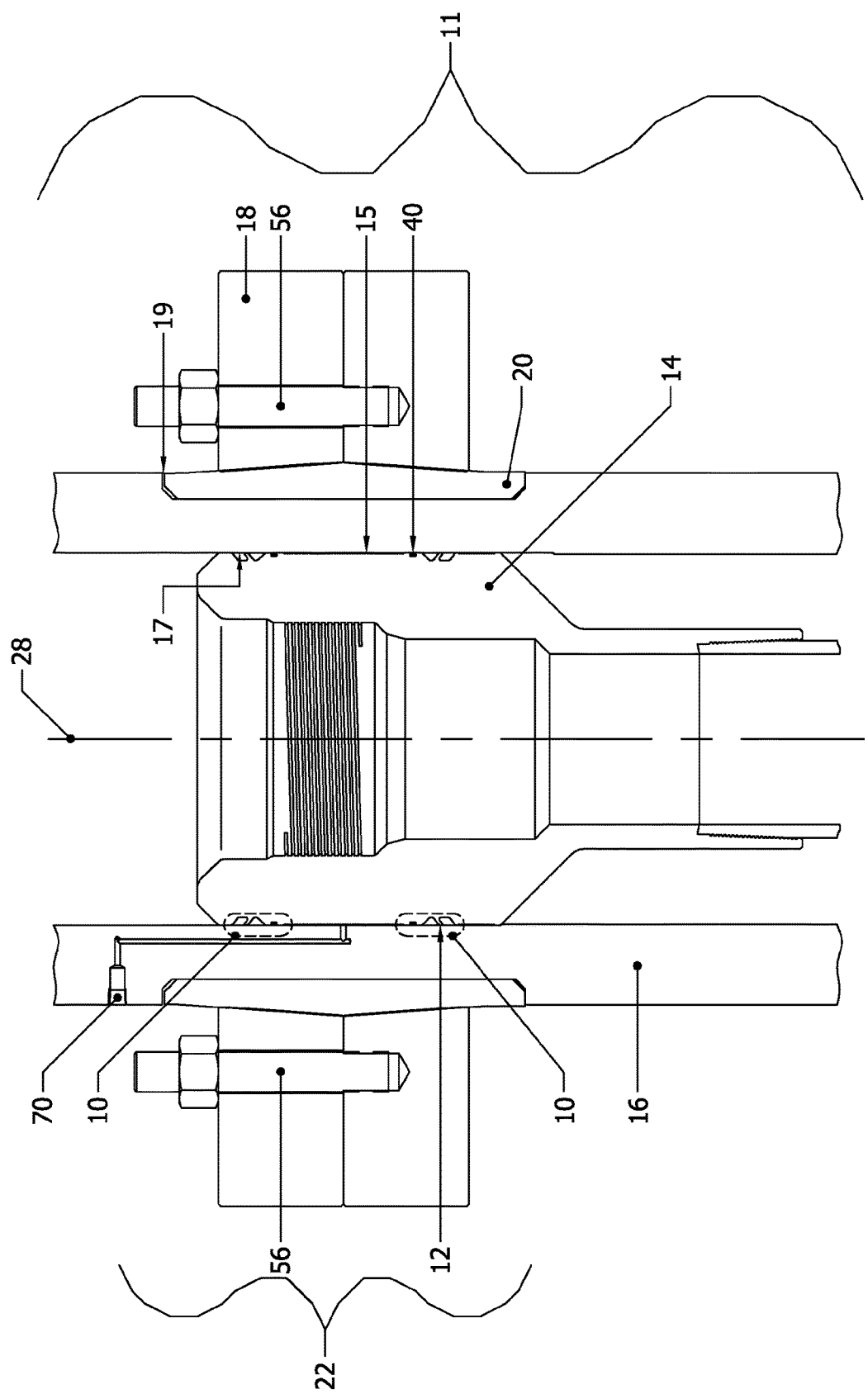
FIG. 1 is a cross section of a preferred embodiment of a wellhead casing including a seal for sealing an annulus between the wellhead casing and an outer member within a wellhead.

As shown in FIG. 1, the present invention provides a seal 10 for a wellhead 11 (a well) and, in particular, provides a seal 10 for an annulus between an inner wellhead casing member 14 (inner well casing) and an outer wellhead casing member 16 (outer well casing). The wellhead 11 incorporates a clamping arrangement 22 whereby the outer member 16 is arranged to be deflected radially inwardly in order to grip and secure the inner member 14 within the bore of the outer member 16. Such a clamping arrangement is available from Plexus Ocean Systems Limited under the trade mark POS-GRIP.

In the embodiment shown in FIG. 1, the clamping arrangement comprises a compression ring 18 or an upper and a lower ring. The compression ring 18 has inner tapered surfaces which are arranged to co-operate with tapered surfaces provided on a collar 20. The compression ring 18 is in two parts (an upper ring and a lower ring). The upper ring can be moved relatively towards the lower ring in order to produce an inwardly directed radial force on the collar 20. The collar surrounds an outer circumference of the outer wellhead member 16. In particular, the collar 20 may be provided within a groove 19 provided around the outer member 16.

The compression ring 18 thereby forces the wall of the outer member 16 inwardly. The outer wellhead member 16 comprises an inner clamping surface 17 which, on contraction, is arranged to grip and clamp a corresponding outer clamping surface 15 of the inner member 14. The force is increased until the required clamping force is achieved and, at this point, the inner member 14 is securely clamped within the outer member 16. In this arrangement, the inner member 14 can be released and re-clamped, if required.

The present invention provides an improved seal for use in such a clamping arrangement 22. In particular, the seal 10 includes a sealing lip 12 which locates within a groove provided in the outer clamping surface 15 of the inner member 14. A seal is activated and created as the outer member 16 is clamped inwardly since this causes the outer member 16 to compress the inner member 14 and to reduce the diameter of the inner member 14. This squeezing of the inner member 14 causes the sealing lip 12 to come into contact with the outer member 16 and to be pressed against the outer member 16. This thereby automatically creates a seal as the inner member 14 is clamped by the outer member 16.

In particular, the present invention provides a sealing arrangement comprising a wellhead casing 14 and a seal 10 for sealing an annulus in a wellhead, the annulus being formed between an outer surface 15 of the wellhead casing 14 and an outer member 16 of the wellhead. The wellhead casing 14 comprises a central longitudinal axis 28 which extends along a longitudinal axis of the wellhead casing 14. The outer clamping surface 15 is arranged to be secured and clamped by the outer member 16. The outer clamping surface 15 is located at an initial radial distance (i.e. prior to the clamping force) from the central longitudinal axis 28 of the wellhead casing 14. The seal 10 comprises a flexible (plastically deformable or yielding) metal sealing lip 12 which projects radially outwardly and away from the central longitudinal axis 28 of the wellhead casing 14. The metal sealing lip 12 has a distal sealing surface for sealing against an inner surface 17 of the outer member 16. Prior to use (i.e. before the application of a clamping force by the clamping arrangement), the sealing surface 26 locates at an initial radial distance relative to the central longitudinal axis 28 which is less than or equal to the initial radial distance of the outer clamping surface 15 of the inner member 14.

In a preferred embodiment the metal sealing lip comprises steel and/or low alloy steel and/or may comprise inconel.

The sealing lip 12 locates in a groove and the sealing lip 12 effectively acts as a partition and defines two grooves 30, 32 located on the outer clamping surface 15 of the inner member 14. Accordingly, a first groove 30 locates below the sealing lip 12 and a second groove 32 locates above the sealing lip 12.

Figure 2:
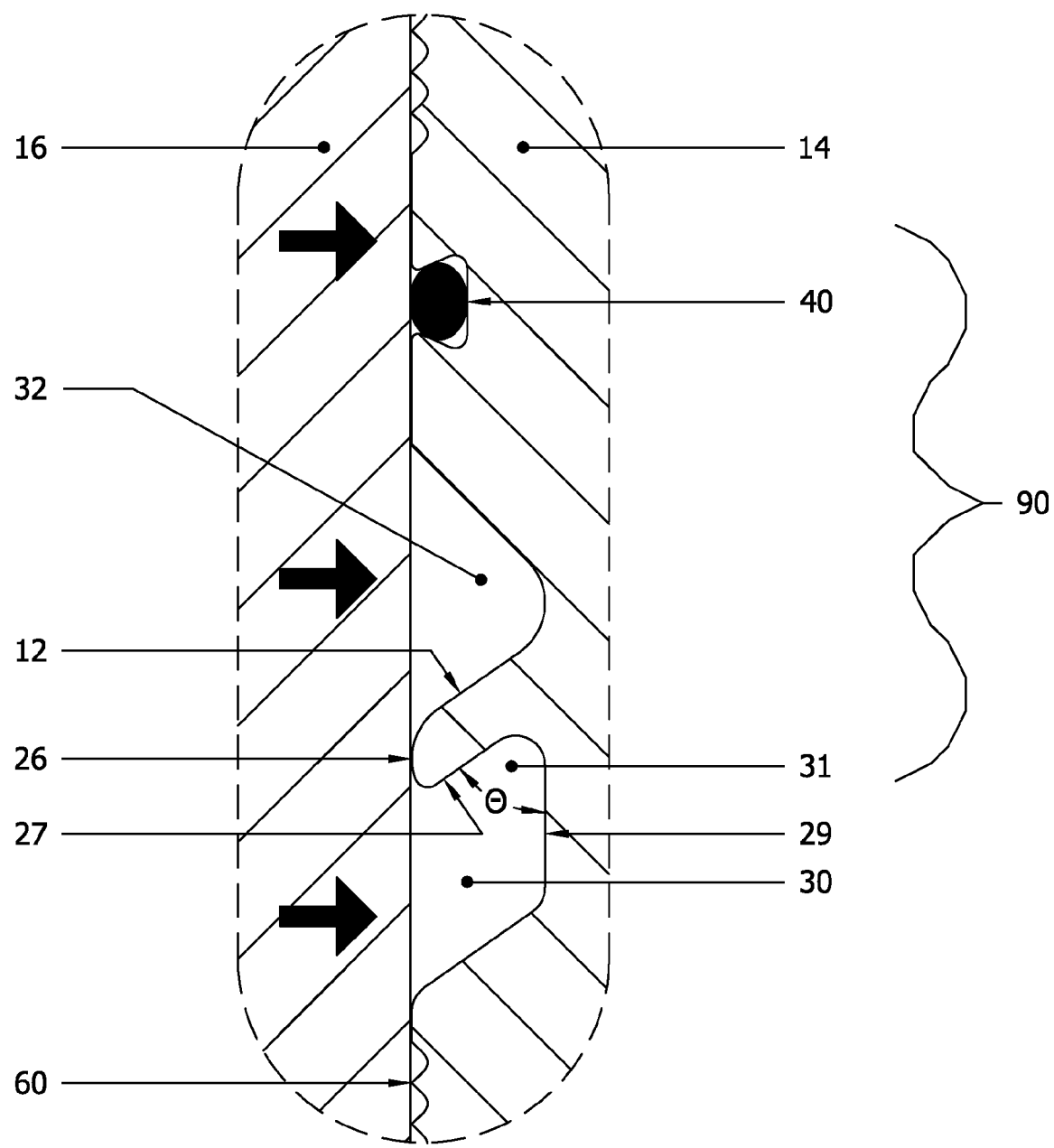
FIG. 2 is a detailed cross section of a preferred embodiment of a wellhead casing and a seal for sealing an annulus between the wellhead casing and an outer member within a wellhead.
Figure 3:
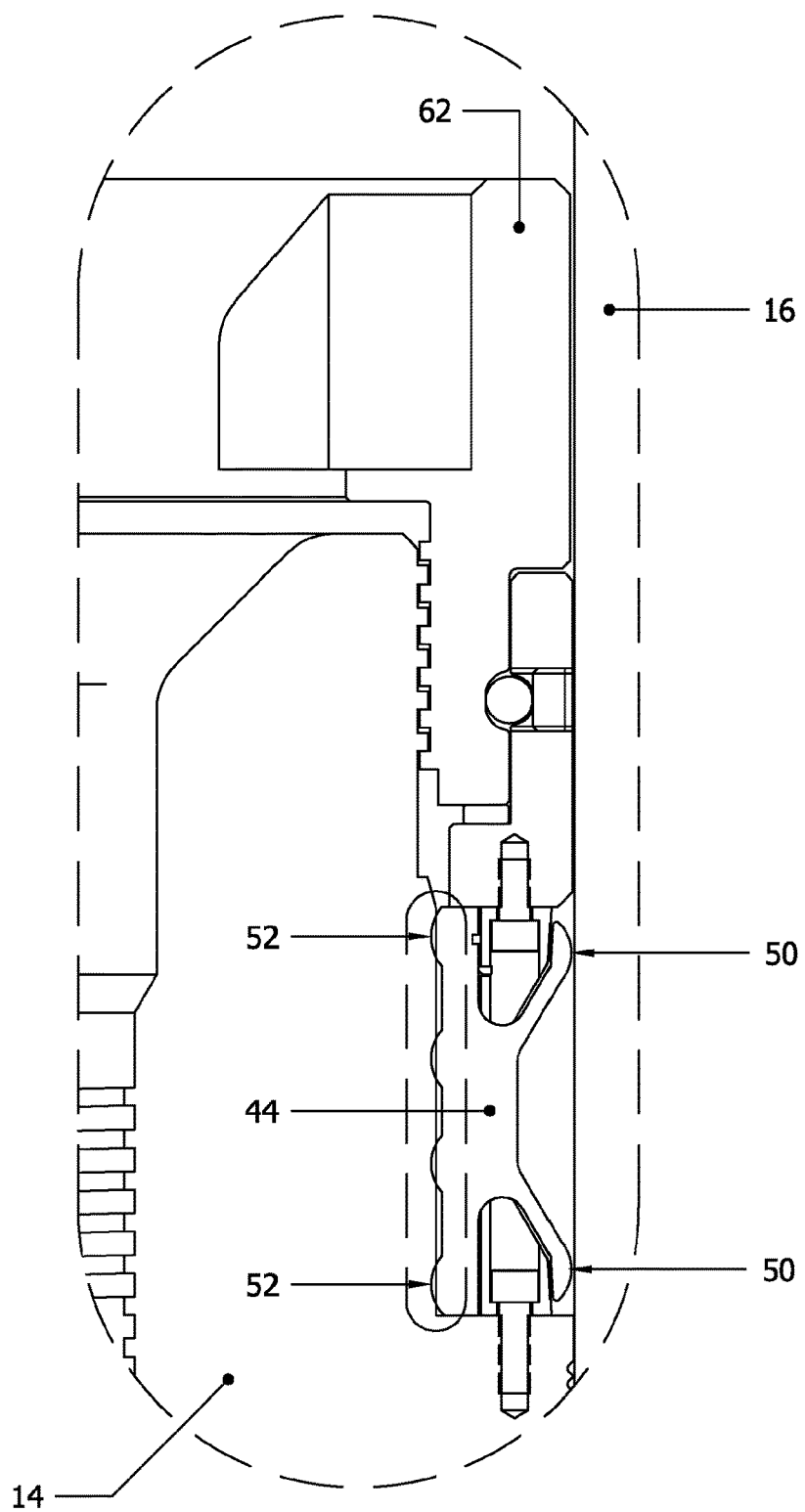
FIG. 3 is detailed cross section of another embodiment of a wellhead casing and a seal for sealing an annulus between the wellhead casing and an outer member within a wellhead.
Figure 4:
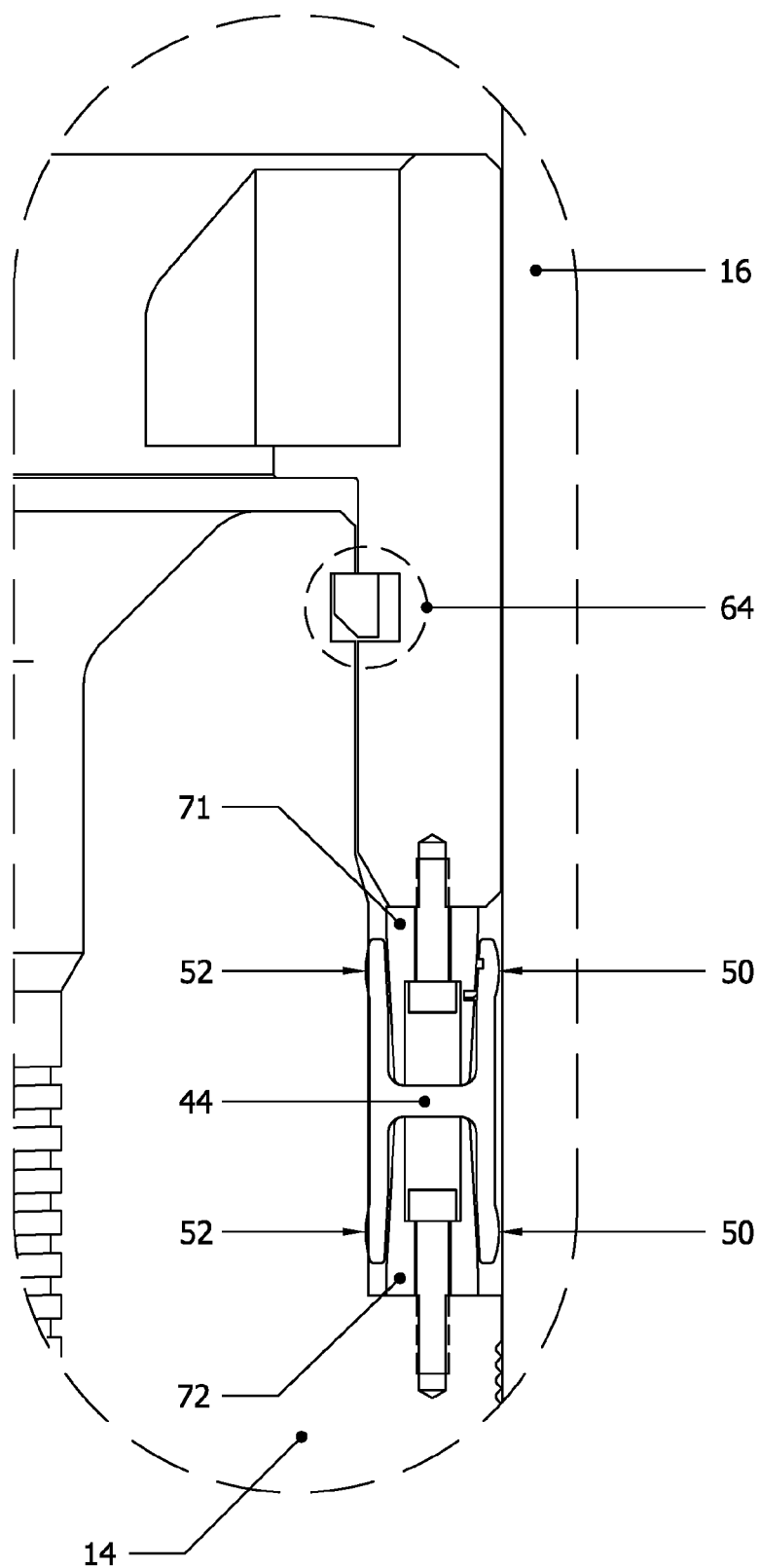
FIG. 4 is a detailed cross section of a further embodiment of a wellhead casing and a seal for sealing an annulus between the wellhead casing member and an outer member within a wellhead.
Figure 5:
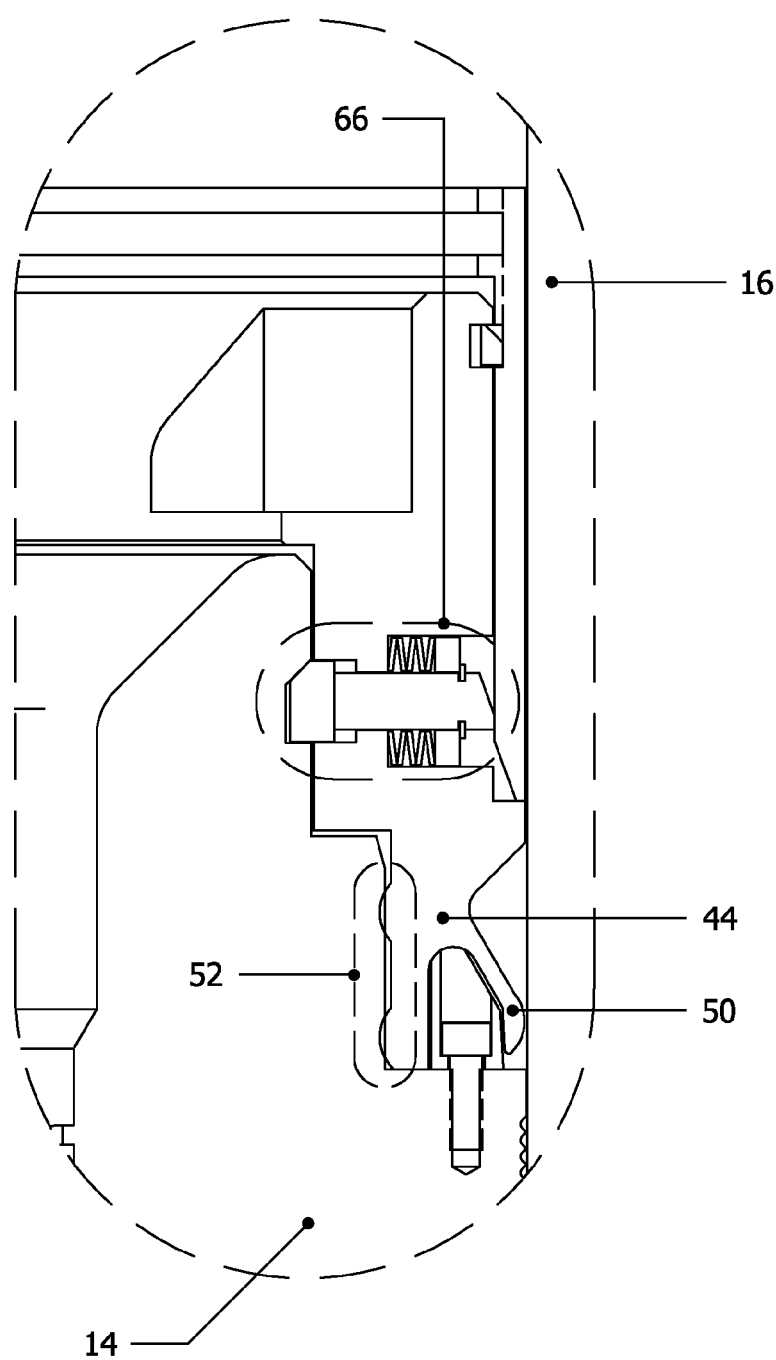
FIG. 5 is a cross section of a yet further embodiment of a wellhead casing and a seal for sealing an annulus between the wellhead casing member and an outer member within a wellhead.

In the preferred embodiment, as shown in FIG. 1 and FIG. 2, the seal 10 including the sealing lip 12 is provided as an integral part of the inner wellhead member 14. However, as shown in FIG. 3, FIG. 4 and FIG. 5, the seal 10 can be provided on a sealing member which is then secured to the inner member 14.

As shown in FIG. 1 and FIG. 2, the sealing lip 12 comprises a circular sealing lip 12 which extends around the circumference of the inner member 14. In particular, the sealing lip 12 provides an annular sealing lip. The sealing lip 12 extends from a base provided between the two grooves 30, 32 and extends to a sealing tip 26 which, thereby, locates at a distal end of the seal 10. The sealing lip 12 extends from the base relatively outwardly at a projection angle (e) to the inner member 14. In particular, the sealing lip 12 is angled towards the annular column or bore which is to be sealed. This angle is arranged to decrease as the sealing lip 12 is flexed inwardly by the clamping force.

In FIG. 1, a wellhead 11 is shown in which the inner member 14 has a lower seal 10 and an upper seal 10. In the lower seal 10 shown in FIG. 1, the sealing lip 12 is angled downwardly towards the annular space or annular column which is to be sealed. In the upper seal, the sealing lip 12 is angled upwardly towards the space in the bore of the outer member 16 which will thereby be sealed.

The sealing tip 26 of the sealing lip 12 has a curved or arcuate outer sealing surface which is arranged to abut and co-operate with the inner clamping surface 17 of the outer member 16. Specifically, a distal sealing tip 26 of the sealing lip 12 may contact the inner surface 17 of the outer member 16. Accordingly, as the clamping arrangement 22 is activated, the inner clamping surface 17 of the outer member 16 moves radially inwardly and contacts and abuts the initial sealing surface of the sealing lip 12. The further radial movement of the outer member 16 inwardly will flex and deflect the sealing lip 12 inwardly such that the sealing lip 12 will remain in direct contact with the inner clamping surface 17 of the outer member 16. Accordingly, the present invention provides an enhanced seal which provides a high quality metal-to-metal seal that is particularly suited for high pressure applications. This seal increases the capability of earlier seals used in this situation which generally comprise an elastomeric O-ring. The radial compression of the wellhead 11 creates all or part of the initial seal and the lockdown load, and the seal is pressure energised to allow sealing at higher pressures.

The inner member 14 provides a clamping zone including a contact area or section comprising teeth 60. These teeth 60 comprise peripheral teeth and aid the clamping between the outer member 16 and the inner member 14. However, these teeth 60 do not seal the annulus. Accordingly, pressurised fluid will flow from the annulus and into a pressure containing cavity 31 located within the groove 30. This pressure containing cavity 31 is defined between a pressure containing wall 27 of the sealing lip 12 and a support surface 29 of the inner member 14. The pressurised fluid in the annulus extends into the cavity 31 and will exert a pressure against the pressure containing surface 27 of the sealing lip 12 and, therefore, this pressurised fluid will urge the sealing lip 12 to flare and extend and, in particular, will urge the projection angle (e) of the sealing lip to increase. This will be in direct opposition to the flexing force (created by the clamping arrangement 22 or inward compression of the outer member 16) and this will thereby increase and/or optimise the sealing strength of the seal. For example, the seal will be energised by the pressure within the annulus. Overall, the present invention provides a pressure energised seal for sealing an annulus within a wellhead.

In one example, the clamping strength of the clamping arrangement 22 may provide a contact stress of 20 000 psi and the seal arrangement may be required to seal annulus pressure up to 20 000 psi. A prior art simple seal may therefore be on the limit in this theoretical example. In practice a contact stress of 20 000 psi may be provided to ensure a seal of up to 10 000 psi. The addition of a 10 000 psi difference provides a large margin for safety. However, with the present invention, the seal is pressure energised and, therefore, the sealing strength will be greater than the pure clamping strength. The pressure of the fluid within the annulus compliments the clamping strength in order to provide a seal with increased sealing strength capabilities. More specifically, the sealing strength will be greater than the clamping strength since the seal is being urged against the inner surface of the outer member by the pressure in the annulus.

The pressure energised seal effect will generally act to increase the strength of a single seal (or sealing lip) in one direction, i.e. from below in FIG. 2. In this arrangement, the seal may be able to seal a pressure of 17 000 psi from below and a pressure of 10 000 psi from above. However, if the wellhead arrangement required a sealing strength of 17 000 psi from above and also from below, then a double seal arrangement could be used, as shown in FIG. 1. In this example, the upper seal is energised from the pressure above the wellhead and the lower seal is energised by the pressure from below the wellhead.

The sealing lip 12 extends outwardly from a support surface 29 on the inner member 14. The sealing lip 12 is arranged at an acute projection angle (e) such that the projection angle (e) will be urged to increase by the pressure in the annulus which is being sealed. Accordingly, the clamping force will flex the sealing lip 12 inwardly (and decrease the projection angle (e)) whereas the pressure within the annulus will urge the sealing lip 12 to flare outwardly (and increase the projection angle (e)). This urging force which tends to flare the sealing lip 12 outwardly thereby increases the sealing strength of the seal over and above the clamping strength (or contact stress) of the securement/clamping arrangement.

With the wellhead clamping arrangement for which this seal 10 is used, the inner wellhead member 14 and the outer wellhead member 16 are dimensioned such that the outer clamping surface 15 of the inner wellhead member 14 is arranged to locate within the inner clamping surface 17 of the outer wellhead member 16. The sealing lip 12 is arranged such that it does not project beyond the circumference of the outer clamping surface 15 of the inner wellhead member 14. Accordingly, the sealing lip 12 does not interfere with the positioning and movement of the inner wellhead member 14. In addition, the sealing lip 12 is protected within the groove.

The clamping arrangement is arranged to squeeze and compress the outer clamping surface 15 of the inner member 14 and this thereby ensures that the sealing lip 12 is activated as the clamping begins to clamp the inner member 14. The further compression of the inner member 14 which may be required to achieve the required clamping force will also retain the seal for the annulus as the sealing lip 12 is flexed inwardly.

The preferred embodiments of the seal will now be described further.

FIG. 1 and FIG. 2 depicts a cross-section through a pressure-energized radial compression set metal-to-metal seal with elastomer backup. In the figures, the seal is set. This invention provides a seal which seals the annular space between the inner member 14 and the outer member 16. In the primary application of this invention, the inner member 14 is a casing hanger or tubing hanger, and the outer member 16 is a wellhead housing (as shown in FIG. 1 and described further below).

The seal profile may be either integral to the outer diameter of the inner member 14 or a separate component (sealing member 44) that is installed onto the outer diameter of the inner member 14 (as shown in FIG. 3, FIG. 4, and FIG. 5). In both the integral seal and in the separate sealing member, the seal profile is parallel to a smooth mating profile on the inner diameter of the outer member 16. The seal profile consists of a flexible metal-sealing lip 12, a groove 30, 32 on either side of the sealing lip 12 to allow the sealing lip 12 to deform with pressure, and may include a back-up elastomer seal 40.

A key feature of the invention is that there is no initial interference between the two members 14, 16. When the components are all in position, external compression of the outer member 16 (which may be provided by a POS-GRIP compression system as described in a previous invention and shown in FIG. 1) brings the two surfaces 15, 17 into contact. Contact pressure along this interface forces the pieces to be concentric and activates the metal-to-metal seals with resilient back-ups (if present). The external compression may create a sealingly clamped interface.

Once activated, the seal 10 has sufficient contact load to seal low pressures. The sealing lip 12 is oriented vertically or angled so that pressure "inside" the seal 10 (in groove 30) acts upon the sealing lip 12 to produce a radial force that will further energize the seal 10, thus enhancing the ability of the seal 10 to seal higher pressures.

As shown in FIG. 3, FIG. 4 and FIG. 5, there are a number of possible configurations for this invention using the pressure-energized radial-compression-set metal-to-metal seal in a separate component. In all of these configurations, the metal seal is built into a metal sealing member. When the seal 10 is a separate sealing member, the seal 10 features an outer seal 50 which seals against the outer member 16 (as shown in FIG. 1 and FIG. 2), and an inner seal 52 which seals against the inner member 14. The inner seal 52 may achieve the seal by any means, including by the means described in this invention. For instance, the inner seal 52 could be simple bump seal (as shown in FIG. 3 and FIG. 5) that is driven into place over a parallel bore or a taper. Alternately, the inner seal 52 could be a lip seal (as shown in FIG. 4) that is set by expanding over an "activation anvil(s)" 71, 72.

The separate sealing member 44 is fixed to the inner member 14 by means of an attachment mechanism that allows the sealing member 44 to be installed and removed. This attachment mechanism may take the form of a separate threaded "nut" 62 (as shown in FIG. 3), a split latch ring 64 (as shown in FIG. 4) or a number of radially-oriented "dogs" 66 (as shown in FIG. 5), which can be activated & locked down by any means. The separate sealing member 44 may feature a single uni-directional seal (as shown in FIG. 2 and FIG. 5) or two oppositely-directed seals (as shown in FIG. 3 and FIG. 4) for sealing pressure from both sides of the seal 10.

FIG. 1 depicts one possible preferred configuration for this invention in a wellhead system. The main components of this system are a "Type-2" POS-GRIP compression system that is part of a wellhead housing, and a casing or tubing hanger 14 with two sets of integral seals 10 as described above. The POS-GRIP compression system provides the energy to compress the wellhead housing.

In this preferred configuration, the upper set of seals 10 seals pressures from above, and the lower set of seals 10 seals pressures from below. Either the wellhead or the casing or tubing hanger may be configured with test ports 70 to enable external testing between the seals 10.

This invention could also be used in a "Type 1" POS-GRIP compression system, or a POS-GRIP connector. Furthermore, the present invention can be used with either a Type 1, Type 2 or Type 3 POS-GRIP system and/or connector as supplied by Plexus Ocean Systems Limited/Plexus Holdings plc.

One embodiment of a clamping arrangement for the present invention provides a clamp or connector which works by elastically deforming a compression adapter onto an internal tubular portion and specifically onto the inner wellhead casing 14 (e.g. an upper sealing mandrel). The clamping arrangement or connector produces a radial load applied internally by a compression ring 18.

The present invention provides a clamping arrangement for sealingly clamping an inner casing to an outer casing. In particular, the present invention provides a fluid tight seal between an inner casing and an outer casing.

In the clamping arrangement, the compression collar 20 includes outwardly tapered surfaces and, in particular, comprises surfaces which are angled towards a central peak. The clamping arrangement 10 includes a compression ring 18 which locates around the outer surfaces of the compression collar 20. The compression ring 18 includes inwardly tapered surfaces and, in particular, includes two inner surfaces which are oppositely tapered with respect to the surfaces of the collar 20. The inner tapered surfaces of the compression ring 18 are arranged to register and co-operate with the tapered surfaces provided on the compression collar 20.

The clamping arrangement includes movement means or activation means in the form of a plurality of activation bolts 56 which locate with the compression ring 18. The activation bolts 56 are mounted in the compression ring 18 and can be tightened to force and urge the two compression ring components towards each other. The tapered surfaces of the compression ring 18 thereby slide over the tapered surface of the collar 20 and force the collar 20 and the wall of the outer member 16 radially inwardly. The co-operation of the tapered surfaces causes the force generated within the bolts to be transferred to a radial force which urges the inner surface of the compression collar 20 inwardly which thereby forces the wall of the outer member 16 inwardly. The movement of the wall of the outer member inwardly causes the inner clamping surface 17 of the outer member 16 to grip and abut the outer clamping surface 15 of the inner wellhead member 14. In particular, the force is sufficient for the inner wellhead member 14 to be firmly gripped by the outer member 16.

The compression ring 18 and the compression collar 20 have oppositely directed axially tapered annular surfaces so that relative axial movement between the compression collar 20 and the compression ring components produces a reduction in the internal diameter of the unit (in particular the internal diameter of the compression collar 20) to distort the wall of the outer member 16 inwards to grip the diameter of the inner wellhead member 14. The oppositely tapered annular surfaces are angled to provide the required inwards movement (compression/distortion) whilst enabling the movement means to produce the relative movement between the compression ring 18 and the compression collar 20.

It is appreciated that the amount of travel of the compression ring 18 to the activated/locked position together with the angles of the tapers will determine the amount of inward deflection caused by the clamping arrangement 10 and hence the gripping force.

In other embodiments of the clamping arrangement, the compression ring 18 and the compression collar 20 each have one tapered annular surface. In the assembled unit, in use, the compression collar 20 has an outer diameter with a first diameter at an upper end and an outer diameter with a second, greater diameter at a lower end. Similarly, in the assembled unit, the compression ring 18 has an inner diameter with a first diameter at an upper end and an inner diameter with a second, greater diameter at a lower end. The clamping arrangement is arranged to deflect the inner surface of the outer member 16 such that the inner surface of the outer member 16 grips the outer surface 15 of the inner wellhead member 14.

The present invention thereby provides an improved seal which increases the inherent pressure rating of the seal. The present invention provides a pressure energised sealing lip 12 which can be run into position in a contactless way and, in which, the seal is activated using a POS-GRIP clamping arrangement.

The invention claimed is:

1. A sealing arrangement comprising an inner well casing and a seal structure for sealing an annulus in a well, the annulus being formed between an outer surface of the inner well casing and an outer well casing in which the inner well casing is concentric with the outer well casing, wherein the inner well casing comprises:
   a central longitudinal axis which extends along a longitudinal axis of the inner well casing; and
   an outer clamping surface which is arranged to be secured and clamped by the outer well casing, the outer clamping surface being located at an initial radial distance from the central longitudinal axis of the inner well casing;
   the seal structure comprising:
   a flexible metal sealing lip which projects radially outwardly and away from the central longitudinal axis of the inner well casing, the metal sealing lip having a distal sealing surface for sealing against an inner surface of the outer well casing and the metal sealing lip projecting from a support surface of the inner well casing; and wherein the metal sealing lip is arranged to provide an auxiliary seal with the outer well casing, in addition to a primary seal provided by the outer clamping surface;

the metal sealing lip extends towards the outer well casing;

a projection angle of the metal sealing lip is defined between a pressure containing surface of the metal sealing lip and the support surface of the inner well casing, and the projection angle of the metal sealing lip is arranged to decrease as the metal sealing lip is flexed to push the sealing surface toward the central longitudinal axis by a clamping force pushing the outer well casing toward the inner well casing, and wherein the projection angle is urged towards a greater projection angle by pressure in the annulus acting on the pressure containing surface which is arranged to urge the sealing surface towards the inner surface of the outer well casing.

2. A sealing arrangement according to claim 1, wherein, prior to use, the sealing surface locates at an initial radial distance relative to the central longitudinal axis which is less than or equal to the initial radial distance of the outer clamping surface of the inner well casing.

3. A sealing arrangement according to claim 1, wherein the pressure in the annulus is arranged to increase the sealing strength of the auxiliary seal.

4. A sealing arrangement according to claim 1, wherein the metal sealing lip is arranged to flare outwardly by pressure of a fluid in the annulus.

5. A sealing arrangement according to claim 1, wherein the clamping force of the outer well casing is arranged to flex the metal sealing lip to create the auxiliary seal between the inner well casing and the outer well casing and wherein the clamping force is arranged to compress the inner well casing in a clamping zone and in which the primary seal is located in the clamping zone.

6. A sealing arrangement according to claim 1, wherein the inner well casing comprises a hanger which is arranged, in use, to suspend a casing string and wherein the hanger is arranged to be clamped in a wellhead and for a casing string to be suspended below the wellhead.

7. A sealing arrangement according to claim 1, wherein the outer clamping surface comprises a sealing surface and in which the outer clamping surface provides a metal-to-metal sealing surface.

8. A sealing arrangement according to claim 1, wherein the inner well casing comprises an upper seal and a lower seal and in which the upper seal is arranged to seal pressure from above the upper seal and the lower seal is arranged to seal pressure from below the lower seal.

9. A sealing arrangement according to claim 1, wherein the metal sealing lip comprises a plastically deformable material.

10. A sealing arrangement according to claim 1, wherein an inwardly directed clamping force is arranged to flex the metal sealing lip such that the metal sealing lip yields.

11. A sealing arrangement according to claim 1, wherein the metal sealing lip extends radially outwardly from a base towards a sealing tip.

12. A sealing arrangement according to claim 1, wherein the metal sealing lip extends radially to the same extent/distance as the outer clamping surface of the inner well casing and the metal sealing lip is arranged to move inwardly as the clamping surface of the inner well casing moves inwardly as the inner well casing is clamped within a clamping arrangement of the well.

13. A sealing arrangement according to claim 1, wherein the wellhead casing is freely moveable through the clamping surface of the outer well casing when the clamping arrangement is inactive and there is no inwardly directed clamping force being applied by or to the outer well casing.

14. A sealing arrangement according to claim 1, wherein the metal sealing lip projects from a support surface of the inner well casing and wherein the support surface is of a reduced diameter relative to the diameter of the clamping surface of the inner well casing.

15. A sealing arrangement according to claim 1, wherein the metal sealing lip locates within a groove.

16. A sealing arrangement according to claim 15, wherein the groove locates within or adjacent to the outer clamping surface of the inner well casing.

17. A sealing arrangement according to claim 15, wherein the groove is arranged to protect the metal sealing lip and the groove prevents or inhibits the metal sealing lip from abutting any obstructions during axial movement of the inner well casing.

18. A sealing arrangement according to claim 1, wherein the auxiliary seal is provided on a sealing member, and the sealing member is a separate component from the inner well casing.

19. A sealing arrangement according claim 18, wherein the sealing member is securable to the inner well casing.

20. A sealing arrangement according to claim 18, wherein the sealing member comprises a first seal region and a second seal region and wherein the first seal region is arranged to seal the annulus from above and the second seal region is arranged to seal the annulus from below.

21. A sealing arrangement according to claim 1, wherein the seal structure is integral to the inner well casing.

22. A well comprising an inner well casing, an outer well casing, a clamping arrangement and a seal structure for sealing an annulus in a well, the annulus being formed between an outer surface of the inner well casing and the outer well casing in which the inner well casing is concentric with the outer well casing, wherein the inner well casing comprises:

a central longitudinal axis which extends along a longitudinal axis of the inner well casing; and an outer clamping surface which is arranged to be secured and clamped by the outer well casing, the outer clamping surface being located at an initial radial distance from the central longitudinal axis of the inner well casing;

the seal structure comprising:

a flexible metal sealing lip which projects radially outwardly and away from the central longitudinal axis of the inner well casing, the metal sealing lip having a distal sealing surface for sealing against an inner surface of the outer well casing and the metal sealing lip projecting from a support surface of the inner well casing; and wherein, the metal sealing lip is arranged to provide an auxiliary seal with the outer well casing, in addition to a primary seal provided by the outer clamping surface;

the metal sealing lip extends towards the outer well casing;

a projection angle of the metal sealing lip is defined between a pressure containing surface of the metal sealing lip and the support surface of the inner well casing, and the projection angle of the metal sealing lip is arranged to decrease as the metal sealing lip is flexed to push the sealing surface toward the central longitudinal axis by a clamping force pushing the outer well casing toward the inner well casing, and wherein the projection angle is urged towards a greater projection angle by pressure in the annulus acting on the pressure containing surface which is arranged to urge the sealing surface towards the inner surface of the outer well casing.

23. A method of sealing an annulus in a well with a seal structure, the annulus being formed between an outer surface of an inner well casing and an outer well casing in which the inner well casing is concentric with the outer well casing, wherein the inner well casing comprises:
   a central longitudinal axis which extends along a longitudinal axis of the inner well casing; and
   an outer clamping surface which is arranged to be secured and clamped by the outer well casing, the outer clamping surface being located at an initial radial distance from the central longitudinal axis of the inner well casing;
   the seal structure comprising:
   a flexible metal sealing lip which projects radially outwardly and away from the central longitudinal axis of the inner well casing, the metal sealing lip having a distal sealing surface for sealing against an inner surface of the outer well casing and the metal sealing lip projecting from a support surface of the inner well casing;
wherein,
   the metal sealing lip is arranged to provide an auxiliary seal with the outer well casing, in addition to a primary seal provided by the outer clamping surface;
   the metal sealing lip extends towards the outer well casing;
   a projection angle of the metal sealing lip is defined between a pressure containing surface of the metal sealing lip and the support surface of the inner well casing, and the projection angle of the metal sealing lip is arranged to decrease as the metal sealing lip is flexed to push the sealing surface toward the central longitudinal axis by a clamping force pushing the outer well casing toward the inner well casing, and wherein the projection angle is urged towards a greater projection angle by pressure in the annulus acting on the pressure containing surface which is arranged to urge the sealing surface towards the inner surface of the outer well casing; and
the method comprising clamping the inner well casing in the outer well casing and compressing the inner well casing and flexing the metal sealing lip radially inwardly.

* * * * *